(No Model.)
H. O. FRENCH.
AMMUNITION MEASURER.
No. 482,120. Patented Sept. 6, 1892.
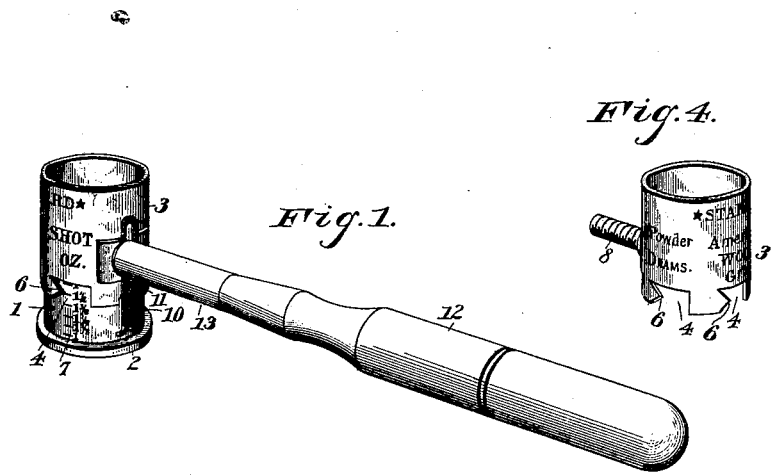
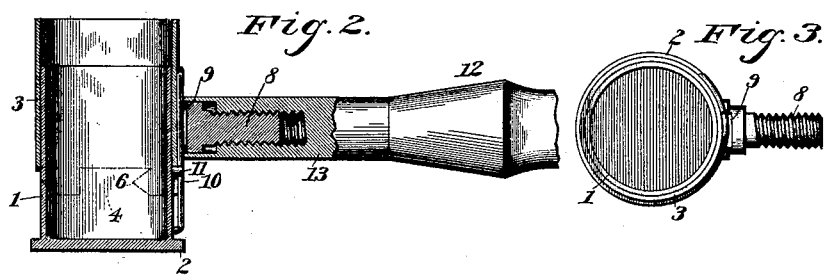
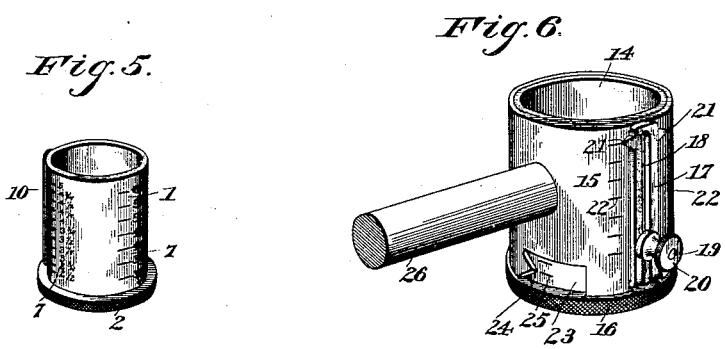
Witnesses:
J. M. Witherud
Horace G. Pierson
Inventor,
Horace O. French,
By his Attorneys,
C. A. Snow & Co.

UNITED STATES PATENT OFFICE.

HORACE O. FRENCH, OF WASHINGTON, DISTRICT OF COLUMBIA.

AMMUNITION-MEASURE.

SPECIFICATION forming part of Letters Patent No. 482,120, dated September 6, 1892.

Application filed May 24, 1892. Serial No. 434,124. (No model.)

*To all whom it may concern:*

Be it known that I, HORACE O. FRENCH, a citizen of the United States, residing at Washington, in the District of Columbia, have invented a new and useful Measure or Charger, of which the following is a specification.

My invention relates to ammunition measures or chargers, and is an improvement upon that class thereof comprising two telescoping shells or cylinders adjustably connected, by means of which the capacity of the charger or measure is increased or diminished. Heretofore in this class of chargers or measures it has been usual to provide a series of graduating-notches in the outer shell, into any one of which a pin or finger located on the inner shell was designed to engage. By this means were provided fixed points indicating certain capacities measuring both powder and shot, which, as is well known to those conversant with their use, is undesirable and inaccurate for the reason that drams of powder and ounces of shot are not of the same bulk. In other words, there should be variation in the capacity of the measure, so that drams and ounces might be accurately measured; but inasmuch as these were employed and each indicated both a dram or an ounce and fractions thereof it was impossible to secure by the measure or charger an accurate dram of powder or an accurate ounce of shot. It was also impossible, by reason of the described means of adjusting the shells one within the other, to secure a scant or full measure—as, for instance, one person may prefer a little less than a given amount, while another may prefer a little more—so that in order to secure it the quantity had to be guessed at. It is also well known that the various makes of powder have varying degrees of specific gravity, and especially is this so when comparing the specific gravity between the black gunpowder and the nitro-powders now commonly used; but regardless of such contingencies and characteristics as have been enumerated but one kind of measure was employed for all, and hence such measure was accurate for none.

The objects of my invention are to provide a simple, cheap, and handy tool of this class which is adapted to overcome the objections above stated; and with such objects in view my invention consists, primarily, in a charger or measure having a plurality of scales, each different from the other and designed for measuring accurately shot, nitro-powders, black gun and other powders, together with a convenient means of securely adjusting the shells together.

Referring to the drawings, in which I have illustrated my invention, Figure 1 is a perspective view of a measure or charger embodying my invention, the same being set to measure one and one-half ounces of shot.
Fig. 2 is a vertical longitudinal section. Fig. 3 is a top plan view, the handle being removed. Fig. 4 is a perspective view in detail of the outer shell or cylinder. Fig. 5 is a similar view of the inner shell or cylinder.
Fig. 6 is a perspective view of a charger or measure the construction of which is slightly modified over those previously referred to.

Like numerals of reference indicate like parts in all the figures of the drawings.

Referring more particularly to Figs. 1 to 5, inclusive, 1 designates the inner shell or cylinder, which is provided with the usual flanged base 2, whose periphery is milled, and 3 designates the outer cylinder or shell, of an internal bore adapting it to fit snugly and slide upon the shell or cylinder 1. The lower edge of the outer cylinder or shell 3 is at intervals provided with notches or cut-out portions forming sight-openings 4, one edge of each of which is shaped to form an inwardly-pointing finger or indicator 6. In this manner a series or plurality of fingers or indicators is provided, which when the shells or cylinders are telescopically moved pass over as many scales which are formed upon the exterior of the side wall of the inner shell or cylinder 1. Each of these scales, which I have indicated as 7, is for the purpose of accurately measuring some make of powder or shot, and each is accurate in its measurement as regards the specific gravity of the same. It will be seen that the indicators or fingers may be set scant or full or between any two of the graduations, so that a full or scant ounce of shot or a full or scant dram of powder may be obtained, and in this manner the experiences or whims of each user may be gratified. As shown in the drawings, each scale has above it stamped upon the outer shell the purpose for which it is employed—as, for instance, "Shot," "Ounce," "Powder," "Drams," "American wood powder," "Grains."

8 designates a threaded stud, which projects from the exterior of the outer shell or cylinder 3, and the same is provided at its base with a slot or transverse opening 9, through which passes the upper end of a wire loop 10, whose lower end is inwardly bent and made fast to the inner cylinder or shell at or near its base. This wire loop lies flat upon the outer shell, which latter slides between the same and inner shell, and the extension movement of the two shells or their separation is limited by means of a stop-pin 11, which is located on the inner shell near its lower end and which moves within said wire loop.

12 designates a handle by which the tool may be conveniently manipulated, and said handle is provided at its inner end with an internally-threaded metal ferrule 13, having a bore adapting it to readily take upon the threaded stud 8 of the measure or charger. The inner end of the ferrule impinges against the wire loop, and thus serves to bind or clamp the wire loop between the outer shell and the inner end of the ferrule. In this manner, the handle acting as a clamping-nut, the user or operator may accurately set the two shells at any desired point at or between any of the scale-marks and clamp the shells together against any movement whatever.

In Fig. 6 I have illustrated a slight modification of my invention. In this figure 14 designates the inner shell or cylinder and 15 the outer shell or cylinder. The inner shell or cylinder is provided with the usual milled base 16, and from the same rises a thin metal plate 17, which extends upwardly from the base of the inner cylinder to a point opposite its upper edge and lies flat against the exterior surface of the outer cylinder 15. This plate is provided with a longitudinal or vertical slot 18, and through it passes a threaded stud 19, extending from the outer surface of the exterior shell or clyinder and located near the lower end of the same. The threaded stud serves the same function as the pin 11 in the former instance, and upon this stud may be mounted the handles previously described; but in this instance I have shown an ordinary thumb-screw 20. This thumb-screw binds against the slotted plate, which I consider as being the equivalent of my wire loop, and clamps the same between the exterior of the outer shell and the inner end of said thumb-nut. The only idea in employing the slotted plate of thin metal is that indicating-fingers 21 may be provided at the opposite edges of the same near its upper end, and in this manner two exterior scales (indicated as 22) may be formed upon the exterior of the outer shell at each side of the slotted plate, over which said fingers 21 may move. The fingers being more readily formed when sheet metal is employed, I prefer sheet metal to the wire in such instance. In this construction the usual notches or recesses 23 at the lower edge of the outer cylinder are employed, as are also the series of indicating-fingers 24, each of which moves over a scale 25, formed on the exterior surface of the inner shell or cylinder. Where the thumb-nut 20 is employed in lieu of the handle, I secure the latter readily to the exterior of the outer shell at one side of the slotted plate, as indicated at 26.

From the foregoing description, in connection with the accompanying drawings, it will be seen that I have accomplished all the various objects of my invention in a cheap and simple manner and have overcome all of the objections raised against the charging-tools now in use and heretofore invented, inasmuch as I may set the charger to measure any desired amount of shot or powder and may accurately set the same to measure drams of various makes of powder having varying degrees of specific gravity.

Having described my invention, what I claim is—

1. In a tool of the class described, the combination of two sliding shells telescopically connected, the inner shell being provided upon its exterior with a scale and the outer shell having its lower edge notched to form a sight-opening and at one side of the same provided with an indicating-finger for moving over the scale, a loop rising from the end of the inner section, a stud passing through the loop and projecting from the outer section, and a clamping-nut on said stud and designed to bear upon the loop, substantially as specified.

2. In a tool of the class described, the combination of two sliding shells telescopically connected, the inner shell being provided upon its exterior with a scale and the outer shell having its lower edge notched to form sight-openings, provided with a scale and at one side of the sight-openings provided with an indicating-finger for moving over the scale, a loop carrying a finger rising from the base of the inner shell, a stud threaded and extending through the loop, and a nut located upon the stud and bearing on the loop, substantially as specified.

3. In a tool of the class described, the combination, with the two telescopically-connected shells, of a threaded stud extending from the outer shell, a slotted loop or plate extending upwardly from the inner shell through recesses formed in the base of the stud, and a clamping-nut threaded on the stud and impinging upon the loop or plate, substantially as specified.

4. In a tool of the class described, the combination, with the telescopically-connected shells, the inner one of which is provided upon its exterior with a series of scales and the outer one of which is provided at its lower edge opposite the scales with recesses having at one side indicating-fingers for moving over the scales, of a threaded stud extending from the outer shell and provided at its base with an opening, a loop extending upwardly from the lower shell through the opening and lying upon the external shell, and a handle terminating at its inner end in a threaded ferrule engaging the nut and at its inner end impinging upon the loop, substantially as specified.

In testimony that I claim the foregoing as my own I have hereto affixed my signature in the presence of three witnesses.

HORACE O. FRENCH.

Witnesses:
WALTER T. WRIGHT,
W. W. WRIGHT,
WILLIAM W. WRIGHT, Jr.